US009915217B2

(12) United States Patent
Bizub et al.

(10) Patent No.: US 9,915,217 B2
(45) Date of Patent: Mar. 13, 2018

(54) METHODS AND SYSTEMS TO DERIVE HEALTH OF MATING CYLINDER USING KNOCK SENSORS

(71) Applicant: General Electric Company, Schenectady, NY (US)

(72) Inventors: Jeffrey Jacob Bizub, Milwaukee, WI (US); Brett Alexander Matthews, Albany, NY (US); Iyad Batal, San Jose, CA (US)

(73) Assignee: General Electric Company, Schenectady, NY (US)

( * ) Notice: Subject to any disclaimer, the term of this patent is extended or adjusted under 35 U.S.C. 154(b) by 432 days.

(21) Appl. No.: 14/639,736

(22) Filed: Mar. 5, 2015

(65) Prior Publication Data
US 2016/0258378 A1    Sep. 8, 2016

(51) Int. Cl.
*F02D 41/24*     (2006.01)
*F02D 35/02*     (2006.01)
*F02D 41/26*     (2006.01)
*G01L 23/22*     (2006.01)
(Continued)

(52) U.S. Cl.
CPC ....... *F02D 41/2474* (2013.01); *F02D 35/027* (2013.01); *F02D 41/2422* (2013.01); *F02D 41/2438* (2013.01); *F02D 41/2441* (2013.01); *F02D 41/26* (2013.01); *F04B 49/065* (2013.01); *F04B 51/00* (2013.01); *G01L 23/22* (2013.01); *G01L 23/225* (2013.01)

(58) Field of Classification Search
CPC ............... F02B 77/085; F02P 5/1526; F02M 2700/1394; F02D 35/027; F02D 41/222; G01M 15/11; G01M 15/12; G01L 23/221; G01L 23/225; G01L 23/226
See application file for complete search history.

(56) References Cited

U.S. PATENT DOCUMENTS

| 4,606,316 | A | * | 8/1986 | Komurasaki | ......... F02P 5/1526 |
| | | | | | 123/406.16 |
| 4,644,918 | A | * | 2/1987 | McDermott | ............ F02P 5/152 |
| | | | | | 123/406.37 |
| 5,029,565 | A | | 7/1991 | Talbot | |

(Continued)

FOREIGN PATENT DOCUMENTS

| CN | 203480037 | 3/2014 |
| EP | 1447654 | 8/2004 |

(Continued)

OTHER PUBLICATIONS

European Search Report & Opinion issued in connection with corresponding EP Application No. 16158535.1 dated Aug. 25, 2016.

(Continued)

*Primary Examiner* — Joseph Dallo
*Assistant Examiner* — Anthony L Bacon
(74) *Attorney, Agent, or Firm* — Fletcher Yoder, P.C.

(57) ABSTRACT

A method of deriving the health of a first cylinder in a reciprocating device includes receiving a first signal from a first knock sensor in proximity to the first cylinder, receiving a second signal from a second knock sensor in proximity to a second cylinder, processing the first signal and the second signal, and deriving the health of the first cylinder by determining whether the first signal is coherent with the second signal.

20 Claims, 11 Drawing Sheets

(51) Int. Cl.
*F04B 49/06* (2006.01)
*F04B 51/00* (2006.01)

(56) References Cited

U.S. PATENT DOCUMENTS

| | | | |
|---|---|---|---|
| 5,060,615 A * | 10/1991 | Hashimoto | G01L 23/225 123/406.16 |
| 5,111,790 A | 5/1992 | Grandy | |
| 5,115,778 A | 5/1992 | Holroyd | |
| 5,119,783 A | 6/1992 | Komurasski | |
| 5,239,473 A | 8/1993 | Ribbens et al. | |
| 5,241,480 A | 8/1993 | Takaku et al. | |
| 5,257,533 A | 11/1993 | Imada | |
| 5,337,240 A | 8/1994 | Nakagawa et al. | |
| 5,339,245 A | 8/1994 | Hirata et al. | |
| 5,361,213 A | 11/1994 | Fujieda et al. | |
| 5,392,642 A | 2/1995 | Tao | |
| 5,400,648 A | 3/1995 | Mahr | |
| 5,452,699 A | 9/1995 | Rossignol | |
| 5,467,638 A | 11/1995 | Philipp | |
| 5,517,969 A * | 5/1996 | Unland | G01L 23/225 123/406.16 |
| 5,522,254 A * | 6/1996 | Kamabora | G01L 23/225 73/114.07 |
| 5,594,649 A | 1/1997 | Cook et al. | |
| 5,693,936 A | 12/1997 | Komachiya et al. | |
| 5,763,769 A | 6/1998 | Kluzner | |
| 5,837,887 A | 11/1998 | Shibata et al. | |
| 5,905,193 A | 5/1999 | Hashizurne et al. | |
| 5,932,801 A | 8/1999 | Akishita et al. | |
| 5,934,256 A | 8/1999 | Wenzlawski et al. | |
| 5,996,398 A | 12/1999 | Schleupen et al. | |
| 6,104,195 A | 8/2000 | Yoshinaga et al. | |
| 6,273,064 B1 | 8/2001 | Scholl et al. | |
| 6,276,334 B1 | 8/2001 | Flynn et al. | |
| 6,330,877 B1 | 12/2001 | Nordin | |
| 6,336,355 B1 | 1/2002 | Sasaki et al. | |
| 6,550,311 B2 | 4/2003 | Sloboda | |
| 6,598,468 B2 | 7/2003 | Zur Loye et al. | |
| 6,662,781 B1 | 12/2003 | Torno et al. | |
| 6,814,054 B2 | 11/2004 | Sauler et al. | |
| 6,862,517 B2 | 3/2005 | Gaitier | |
| 6,885,932 B2 | 4/2005 | Liu et al. | |
| 6,889,655 B1 * | 5/2005 | Demizu | F02P 5/1526 123/406.16 |
| 6,912,460 B2 | 6/2005 | Sauter et al. | |
| 6,947,829 B2 | 9/2005 | Honda | |
| 6,978,771 B2 | 12/2005 | Kuzuyama et al. | |
| 6,990,947 B2 | 1/2006 | Kuzuyama et al. | |
| 7,021,128 B2 | 4/2006 | Rauchfuss et al. | |
| 7,027,909 B2 | 4/2006 | deBotton et al. | |
| 7,181,338 B2 | 2/2007 | Takemura et al. | |
| 7,191,658 B2 | 3/2007 | Oda et al. | |
| 7,212,909 B2 | 5/2007 | Yoshino et al. | |
| 7,243,529 B2 | 7/2007 | Takemura et al. | |
| 7,246,600 B2 | 7/2007 | Nakashima et al. | |
| 7,260,469 B2 | 8/2007 | Birk et al. | |
| 7,263,872 B2 | 9/2007 | Danet et al. | |
| 7,310,993 B2 | 12/2007 | Popielas et al. | |
| 7,325,529 B2 | 2/2008 | Ancimer et al. | |
| 7,356,404 B2 | 4/2008 | Takemura et al. | |
| 7,376,506 B2 | 5/2008 | Schueler | |
| 7,383,816 B2 | 6/2008 | Zurlo | |
| 7,444,231 B2 | 10/2008 | Ancimer et al. | |
| 7,444,236 B2 | 10/2008 | Wiles | |
| 7,448,254 B2 | 11/2008 | Kurtz et al. | |
| 7,546,198 B2 | 6/2009 | Remelman | |
| 7,559,230 B2 | 7/2009 | Zimmer | |
| 7,571,640 B2 | 8/2009 | Andrews | |
| 7,628,253 B2 | 12/2009 | Lin et al. | |
| 7,669,582 B2 | 3/2010 | Huang | |
| 7,712,450 B2 | 5/2010 | Sato et al. | |
| 7,747,380 B2 | 6/2010 | Chauvin et al. | |
| 7,810,469 B2 | 10/2010 | Vigild et al. | |
| 7,823,561 B2 | 11/2010 | Omuro et al. | |
| 8,000,884 B2 | 8/2011 | Aso et al. | |
| 8,032,293 B2 | 10/2011 | Binder et al. | |
| 8,069,972 B2 | 11/2011 | Auclair et al. | |
| 8,078,389 B2 | 12/2011 | Huang et al. | |
| 8,079,261 B2 | 12/2011 | Crickmore et al. | |
| 8,108,131 B2 | 1/2012 | Huang et al. | |
| 8,155,857 B2 | 4/2012 | Loeffler et al. | |
| 8,250,905 B2 | 4/2012 | Schneider et al. | |
| 8,260,531 B2 | 9/2012 | Yasuda | |
| 8,316,824 B2 | 11/2012 | Hagari et al. | |
| 8,342,011 B2 | 1/2013 | Galtier et al. | |
| 8,359,909 B2 | 1/2013 | Duval et al. | |
| 8,396,649 B2 | 3/2013 | Huang | |
| 8,463,533 B2 | 6/2013 | Glugla et al. | |
| 8,499,623 B2 | 8/2013 | Duval et al. | |
| 8,528,521 B2 | 9/2013 | Landsmann et al. | |
| 8,538,666 B2 | 9/2013 | Buslepp et al. | |
| 8,606,484 B2 | 12/2013 | Ohata | |
| 8,627,800 B2 | 1/2014 | Glugla et al. | |
| 8,639,432 B2 | 1/2014 | Matsuo et al. | |
| 8,680,707 B2 | 3/2014 | Childs et al. | |
| 8,677,975 B2 | 8/2014 | Muhammad et al. | |
| 8,849,471 B2 | 9/2014 | Daniel et al. | |
| 2001/0015197 A1 * | 8/2001 | Elliott | F02D 35/027 123/406.16 |
| 2001/0042398 A1 * | 11/2001 | Sloboda | F02D 35/027 73/35.04 |
| 2002/0007818 A1 | 1/2002 | Lodise et al. | |
| 2003/0102175 A1 * | 6/2003 | Wakashiro | B60K 6/485 180/65.26 |
| 2006/0236753 A1 * | 10/2006 | Yoshihara | G01L 23/225 73/35.09 |
| 2007/0028893 A1 * | 2/2007 | Hernandez | F02P 5/1526 123/406.16 |
| 2007/0137284 A1 | 6/2007 | Kluth et al. | |
| 2009/0048729 A1 * | 2/2009 | Waters | G01M 15/042 701/31.4 |
| 2009/0211337 A1 * | 8/2009 | Masuda | G01L 23/225 73/35.09 |
| 2009/0223281 A1 * | 9/2009 | Masuda | G01L 23/225 73/35.09 |
| 2010/0168991 A1 * | 7/2010 | Hamama | F02D 35/027 701/111 |
| 2011/0077846 A1 | 3/2011 | Zavala Jurado et al. | |
| 2014/0000552 A1 | 1/2014 | Glugla et al. | |
| 2014/0288762 A1 * | 9/2014 | Sakayori | F02D 41/123 701/31.3 |

FOREIGN PATENT DOCUMENTS

| | | |
|---|---|---|
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

Reduction Piston Slap Excitation by Optimizing Piston Profiles; Takayuki KOIZUMI et al.; Proc. of 2002 IMAC-XX: Conf. & Exposition on Structural Dynamics, Jun. 12-15, 2000.

VE Piston Dynamics; FEV Group, Inc.; available online; www.fev.com/what-we-do/software/virtual-engine-powertrain-dynamics-simulation/piston-dynamics-module; Jan. 1, 2015.

Diagnostic Internal Combustion Engine Based on Crankshaft Angular Acceleration; Binh Le Khac, Tuma J.; available online; www.researchgate.net, May 2012.

(56) References Cited

OTHER PUBLICATIONS

Bolt loosening detection using vibration characteristics of thin plate with piezoelectric elements;Takeshi Nakahara et al; Proc.of SPIE 5391, Smart Struc. & Materials, Jul. 2004.

* cited by examiner

METHODS AND SYSTEMS TO DERIVE HEALTH OF MATING CYLINDER USING KNOCK SENSORS

BACKGROUND

The subject matter disclosed herein relates to knock sensors, and more specifically, to knock sensors mounted to multi-cylinder reciprocating devices.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power.

Knock sensors can be used to monitor multi-cylinder reciprocating devices. A knock sensor can be mounted to the exterior of a cylinder and used to determine whether or not the reciprocating device is running as desired. Knock sensors sometimes malfunction, break during operation, or may be wired to the wrong cylinder. Thus, it would be beneficial to have a way to check the data collected by a knock sensor, and/or take measurements of a cylinder using knock sensors mounted on a different cylinder in the event that the primary knock sensor stops working during operation.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, method of deriving the health of a first cylinder in a reciprocating device includes receiving a first signal from a first knock sensor in proximity to the first cylinder, receiving a second signal from a second knock sensor in proximity to a second cylinder, processing the first signal and the second signal, and deriving the health of the first cylinder by determining whether the first signal is coherent with the second signal.

In a second embodiment, a system includes a controller configured to control a reciprocating engine, the controller includes a processor configured to receive a first signal from a first knock sensor in proximity to a first cylinder, receive a second signal from a second knock sensor in proximity to a second cylinder, process the first signal and the second signal, and derive the health of the first cylinder by determining whether the first signal is coherent with the second sensor.

In a third embodiment, a non-transitory computer readable medium includes executable instructions that when executed cause a processor to receive a first signal from a first knock sensor in proximity to a first cylinder, receive a second signal from a second knock sensor in proximity to a second cylinder, wherein the first cylinder is 360 crank angle degrees out of phase with the second cylinder, process the first signal and the second signal, and derive the health of the first cylinder comprising determining whether the first signal is coherent with the second sensor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Knock sensors sometimes experience undesired maintenance events. Thus, it would be beneficial to have a way to verify the data collected by a knock sensor, and/or take measurements of a cylinder using knock sensors mounted on a different cylinder in the event that the primary knock sensor stops working during operation. By using the signal from a first cylinder's knock sensor, the reciprocating system can more robustly query the signal for a second cylinder (e.g., mating cylinder) or use the first cylinder's knock sensor to "limp home" (i.e., determine the health of the measured cylinder) if the second cylinder's knock sensor is determined to be nonfunctional during engine operation.

Techniques described herein provide for receiving a first signal from a first knock sensor in proximity to the first cylinder, receiving a second signal from a second knock sensor in proximity to a second cylinder, processing the first signal and the second signal, and deriving the health of the first cylinder by determining whether the first signal is coherent with the second signal. Processing may include signature analysis, application of the ADSR (or ASDR) envelope, machine learning, and the like. Machine learning may include the use of feature vectors or predictive frequency bands. Processing may also include smoothing the signals. The same systems and methods disclosed may also be used to derive the health of one cylinder using the knock sensor signal from another cylinder.

Figure 1:
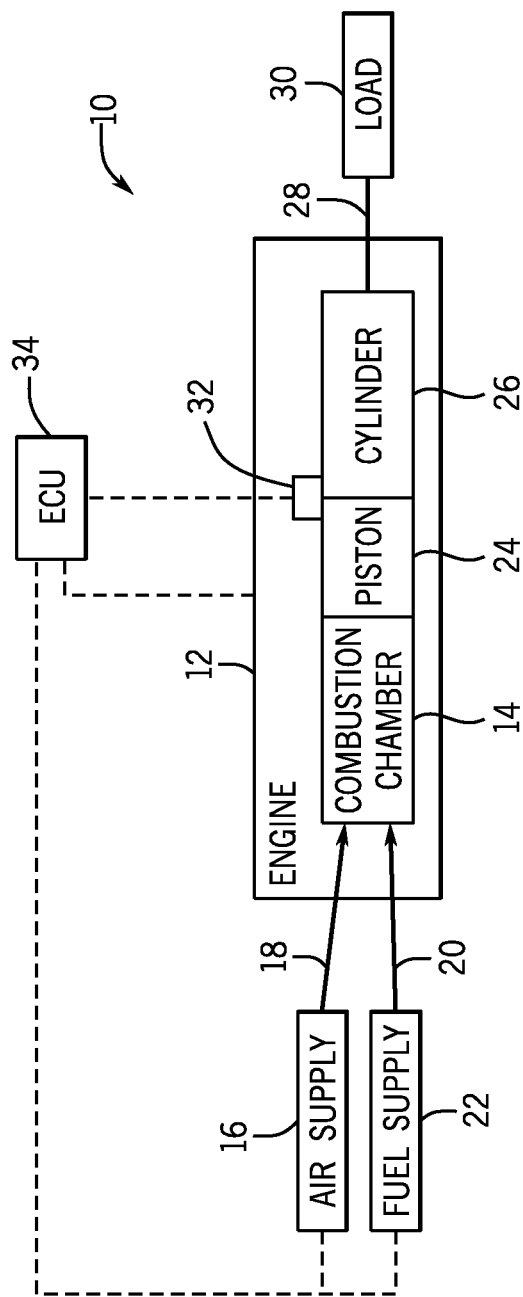
FIG. 1 is a block diagram of an embodiment of an engine driven power generation system in accordance with aspects of the present disclosure.

Turning to the drawings, FIG. 1 illustrates a block diagram of an embodiment of a portion of an engine driven power generation system 10. As described in detail below, the system 10 includes an engine 12 (e.g., a reciprocating internal combustion engine) having one or more combustion chambers 14 (e.g., 1, 2, 3, 4, 5, 6, 7, 8, 10, 12, 14, 16, 18, 20, or more combustion chambers 14). Though FIG. 1 shows a combustion engine 12, it should be understood that any reciprocating device may be used. An air supply 16 is configured to provide a pressurized oxidant 18, such as air, oxygen, oxygen-enriched air, oxygen-reduced air, or any combination thereof, to each combustion chamber 14. The combustion chamber 14 is also configured to receive a fuel 20 (e.g., a liquid and/or gaseous fuel) from a fuel supply 22, and a fuel-air mixture ignites and combusts within each combustion chamber 14. The hot pressurized combustion gases cause a piston 24 adjacent to each combustion chamber 14 to move linearly within a cylinder 26 and convert pressure exerted by the gases into a rotating motion, which causes a shaft 28 to rotate. Further, the shaft 28 may be coupled to a load 30, which is powered via rotation of the shaft 28. For example, the load 30 may be any suitable device that may generate power via the rotational output of the system 10, such as an electrical generator. Additionally, although the following discussion refers to air as the oxidant 18, any suitable oxidant may be used with the disclosed embodiments. Similarly, the fuel 20 may be any suitable gaseous fuel, such as natural gas, associated petroleum gas, propane, biogas, sewage gas, landfill gas, coal mine gas, for example.

The system 10 disclosed herein may be adapted for use in stationary applications (e.g., in industrial power generating engines) or in mobile applications (e.g., in cars or aircraft). The engine 12 may be a two-stroke engine, three-stroke engine, four-stroke engine, five-stroke engine, or six-stroke engine. The engine 12 may also include any number of combustion chambers 14, pistons 24, and associated cylinders 26 (e.g., 1-24). For example, in certain embodiments, the system 10 may include a large-scale industrial reciprocating engine 12 having 4, 6, 8, 10, 16, 24 or more pistons 24 reciprocating in cylinders 26. In some such cases, the cylinders 26 and/or the pistons 24 may have a diameter of between approximately 13.5-34 centimeters (cm). In some embodiments, the cylinders 26 and/or the pistons 24 may have a diameter of between approximately 10-40 cm, 15-25 cm, or about 15 cm. The system 10 may generate power ranging from 10 kW to 10 MW. In some embodiments, the engine 12 may operate at less than approximately 1800 revolutions per minute (RPM). In some embodiments, the engine 12 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 12 may operate between approximately 750-2000 RPM, 900-1800 RPM, or 1000-1600 RPM. In some embodiments, the engine 12 may operate at approximately 1800 RPM, 1500 RPM, 1200 RPM, 1000 RPM, or 900 RPM. Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 10 may include one or more knock sensors 32 suitable for detecting engine "knock" and/or other run characteristics of the engine 12. In some embodiments, the knock sensor may be mounted to the cylinder 26 of the engine head. However, the knock sensor 32 need not be mounted to the cylinder in order to sense vibration. In some embodiments, the knock sensor 32 may be placed in proximity to the cylinder 26. The knock sensor 32 may be any sensor configured to sense vibration caused by the engine 12, such as vibration due to detonation, pre-ignition, and or pinging. The knock sensor 32 is shown communicatively coupled to a controller (e.g., a reciprocating device controller), engine control unit (ECU) 34. During operations, signals from the knock sensors 32 are communicated to the ECU 34 to determine if knocking conditions (e.g., pinging), or other behaviors exist. The ECU 34 may then adjust certain engine 12 parameters to ameliorate or avoid the undesirable conditions. For example, the ECU 34 may adjust ignition timing and/or adjust boost pressure to avoid knocking. As further described herein, the knock sensors 32 may additionally detect other vibrations beyond knocking. Although the following techniques for analyzing component health are discussed in terms of a combustion engine, the same techniques may be applied to other reciprocating devices, such as a compressor.

In some embodiments of a multi-cylinder engine 12, a cylinder 26 may have a mating cylinder. A mating cylinder that is 360 crankangle degrees out of phase with the cylinder 26 in question. That is, in some embodiments, a cylinder 26 goes through a complete intake, compression, combustion, exhaust cycle over 720 two complete rotations of the crankshaft (i.e., 720 crankangle degrees). A mating cylinder is a cylinder that 360 crankangle degrees out of phase with the cylinder 26 in question. Because of this, the pistons 24 of the cylinder 26 and the mating cylinder are in the same position, but the cylinders are in opposite phases of the combustion cycle. A knock sensor 32 mounted on cylinder 26 may be able to detect vibrations from the mating cylinder. For example, a knock sensor mounted on cylinder 26 may be able to sense combustion events (e.g., peak firing pressure) in the mating cylinder. Accordingly, the knock sensor 32 mounted to cylinder 26 may be used to derive information about the mating cylinder. Furthermore, because the phasing of the cylinder 26 and the mating cylinder is known, signals from knock sensors 32 mounted on each cylinder may be shifted and compared to one another.

Figure 2:
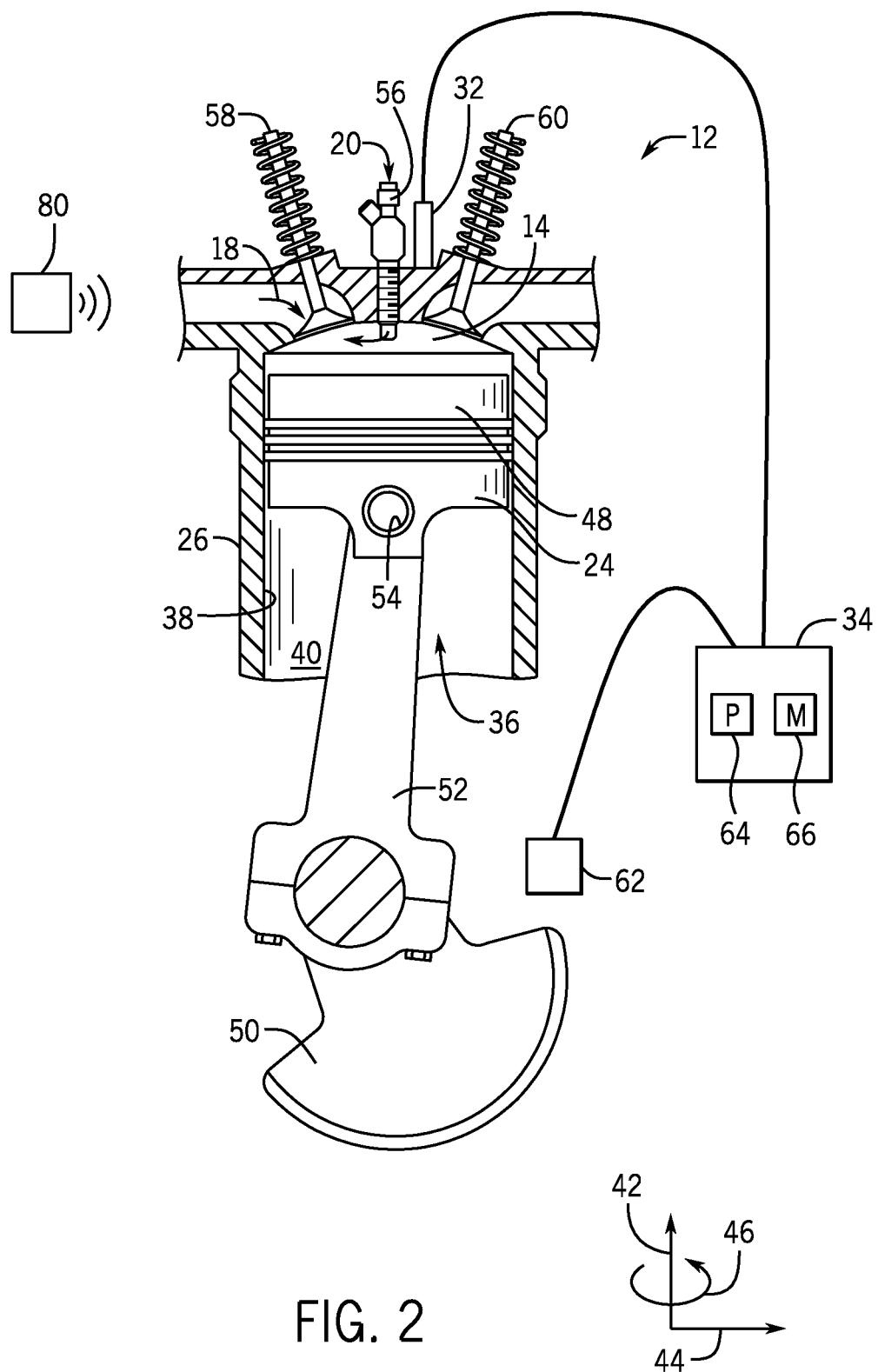
FIG. 2 is a side cross-sectional view of an embodiment of a piston assembly in accordance with aspects of the present disclosure.

FIG. 2 is a side cross-sectional view of an embodiment of a piston assembly 36 having a piston 24 disposed within a cylinder 26 (e.g., an engine cylinder) of the reciprocating engine 12. The cylinder 26 has an inner annular wall 38 defining a cylindrical cavity 40 (e.g., bore). The piston 24 may be defined by an axial axis or direction 42, a radial axis or direction 44, and a circumferential axis or direction 46. The piston 24 includes a top portion 48 (e.g., a top land). The top portion 48 generally blocks the fuel 20 and the air 18, or a fuel-air mixture, from escaping from the combustion chamber 14 during reciprocating motion of the piston 24.

As shown, the piston 24 is attached to a crankshaft 50 via a connecting rod 52 and a pin 54. The crankshaft 50 translates the reciprocating linear motion of the piston 24 into a rotating motion. As the piston 24 moves, the crankshaft 50 rotates to power the load 30 (shown in FIG. 1), as discussed above. As shown, the combustion chamber 14 is positioned adjacent to the top land 48 of the piston 24. A fuel injector 56 provides the fuel 20 to the combustion chamber 14, and an intake valve 58 controls the delivery of air 18 to the combustion chamber 14. An exhaust valve 60 controls discharge of exhaust from the engine 12. However, it should be understood that any suitable elements and/or techniques for providing fuel 20 and air 18 to the combustion chamber 14 and/or for discharging exhaust may be utilized, and in some embodiments, no fuel injection is used. In operation, combustion of the fuel 20 with the air 18 in the combustion chamber 14 cause the piston 24 to move in a reciprocating manner (e.g., back and forth) in the axial direction 42 within the cavity 40 of the cylinder 26.

During operations, when the piston 24 is at the highest point in the cylinder 26 it is in a position called top dead center (TDC). When the piston 24 is at its lowest point in the cylinder 26, it is in a position called bottom dead center (BDC). As the piston 24 moves from top to bottom or from bottom to top, the crankshaft 50 rotates one half of a revolution. Each movement of the piston 24 from top to bottom or from bottom to top is called a stroke, and engine 12 embodiments may include two-stroke engines, three-stroke engines, four-stroke engines, five-stroke engine, six-stroke engines, or more.

During engine 12 operation, a sequence including an intake process, a compression process, a power process, and an exhaust process typically occurs. The intake process enables a combustible mixture, such as fuel and air, to be pulled into the cylinder 26, thus the intake valve 58 is open and the exhaust valve 60 is closed. The compression process compresses the combustible mixture into a smaller space, so both the intake valve 58 and the exhaust valve 60 are closed. The power process ignites the compressed fuel-air mixture, which may include a spark ignition through a spark plug system, and/or a compression ignition through compression heat. The resulting pressure from combustion then forces the piston 24 to BDC. The exhaust process typically returns the piston 24 to TDC while keeping the exhaust valve 60 open. The exhaust process thus expels the spent fuel-air mixture through the exhaust valve 60. It is to be noted that more than one intake valve 58 and exhaust valve 60 may be used per cylinder 26.

The engine 12 may also include a crankshaft sensor 62, one or more knock sensors 32, and the engine control unit (ECU) 34, which includes a processor 64 and memory 66 (e.g., non-transitory computer readable medium). The crankshaft sensor 62 senses the position and/or rotational speed of the crankshaft 50. Accordingly, a crank angle or crank timing information may be derived. That is, when monitoring combustion engines, timing is frequently expressed in terms of crankshaft 50 angle. For example, a full cycle of a four stroke engine 12 may be measured as a 720° cycle. The one or more knock sensors 32 may be a Piezo-electric accelerometer, a microelectromechanical system (MEMS) sensor, a Hall effect sensor, a magnetostrictive sensor, and/or any other sensor designed to sense vibration, acceleration, sound, and/or movement. In other embodiments, sensor 32 may not be a knock sensor in the traditional sense, but any sensor that may sense vibration, pressure, acceleration, deflection, or movement.

Because of the percussive nature of the engine 12, the knock sensor 32 may be capable of detecting signatures even when mounted on the exterior of the cylinder 26. The knock sensor 32 may also be capable of detecting signatures from one or more mating cylinders 80 (i.e., cylinders that are 360 crankangle degrees out of phase with cylinder 2). The knock sensor 32 may also be capable of detecting vibrations from other neighboring cylinders. The one or more knock sensors 32 may be disposed at many different locations on the engine 12. For example, in FIG. 2, one knock sensors 32 is shown on the head of the cylinder 26. In other embodiments, one or more knock sensors 32 may be mounted on the side of the cylinder 26, on the cylinder head, on a cylinder head bolt, on the engine block, or on an engine main bearing cross-tie bolt. Additionally, in some embodiments, a single knock sensor 32 may be shared, for example, with one or more adjacent cylinders 26. In other embodiments, each cylinder 26 may include one or more knock sensors 32 on either or both sides of a cylinder 26. In some embodiments, the knock sensor may not be in contact with the cylinder at all, but merely in proximity to the cylinder. The crankshaft sensor 62 and the knock sensor 32 are shown in electronic communication with the engine control unit (ECU) 34. The ECU 34 includes a processor 64 and a memory 66. The memory 66 may store non-transitory code or computer instructions that may be executed by the processor 64. The ECU 34 monitors and controls and operation of the engine 12, for example, by adjusting spark timing, valve 58, 60 timing, adjusting the delivery of fuel and oxidant (e.g., air), and so on.

Knock sensors 32 are used to detect engine knock. Engine knock is the premature combustion of fuel outside the envelope of normal combustion. In some cases, the ECU 34 may attempt to reduce or avoid engine knock when it occurs by adjusting the operating parameters of the engine. For example, the ECU 34 may adjust the air/fuel mix, ignition timing, boost pressure, etc. in an effort to reduce or avoid engine knock. However, knock sensors may also be used to detect other vibrations in an engine unrelated to engine knock.

Figure 3:
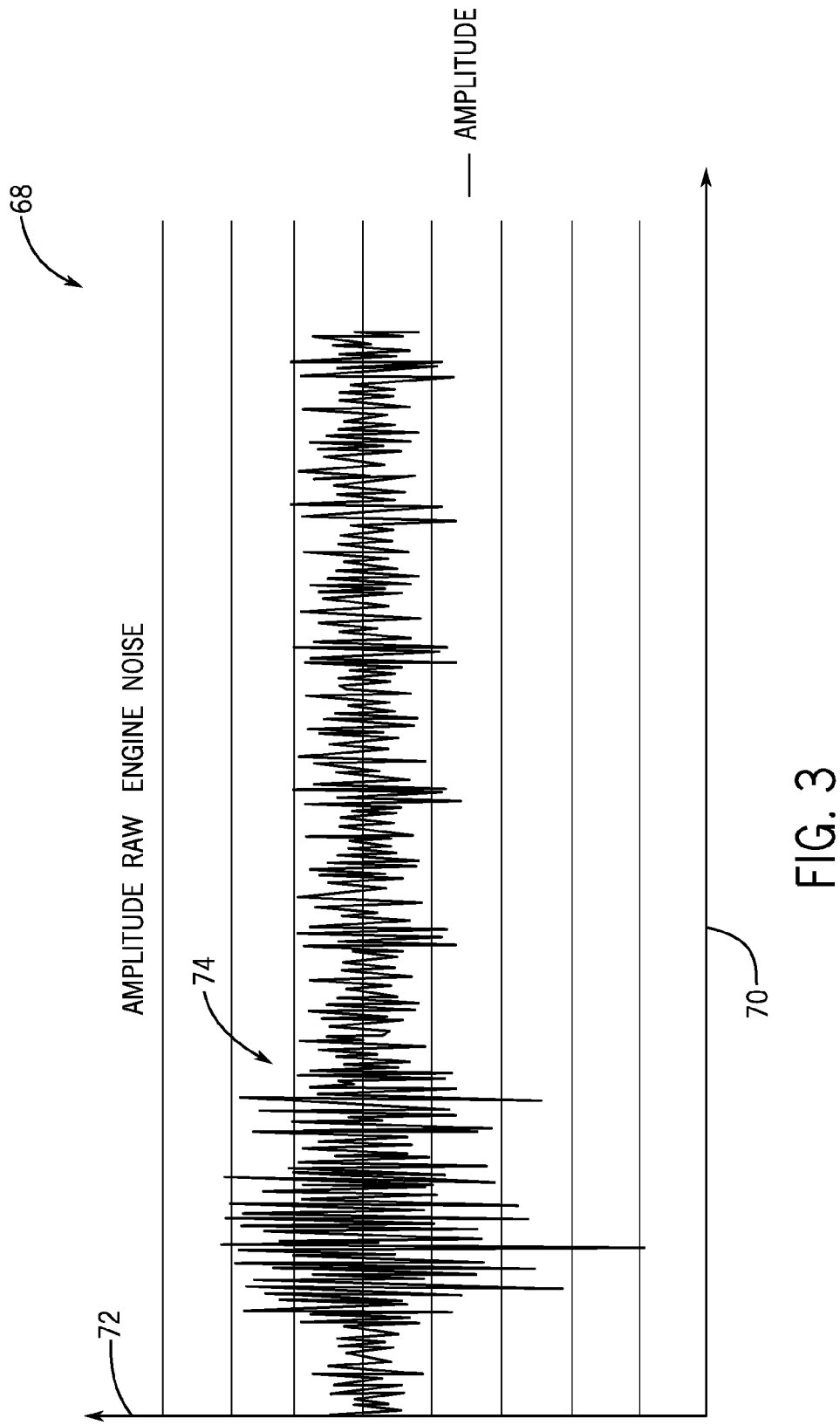
FIG. 3 is an embodiment of an engine noise plot of data measured by the knock sensor shown in FIG. 2 in accordance with aspects of the present disclosure.

FIG. 3 is an embodiment of a raw engine noise plot 68 derived (e.g., by the ECU 34) of noise data measured by a single knock sensor 32 mounted on a single cylinder 26 in which x-axis 70 is time and the y-axis 72 is raw noise amplitude. In the depicted embodiment, an amplitude curve 74 of the knock sensor 32 signal is shown. That is, the raw signal 74 includes amplitude measurements of vibration data (e.g., noise, sound data) sensed via the knock sensor 32 and plotted against time. It should be understood that this is merely a plot 68 of a sample data set, and not intended to limit plots generated by the ECU 34. It should also be understood that plot 68 is of a signature from one knock sensor 32 mounted to one cylinder 26. In other embodiments there may be multiple signatures from multiple knock sensors mounted to multiple cylinders, e.g., mating cylinders. The raw signal 74 may then be further processed, as will be described later.

Figure 4:
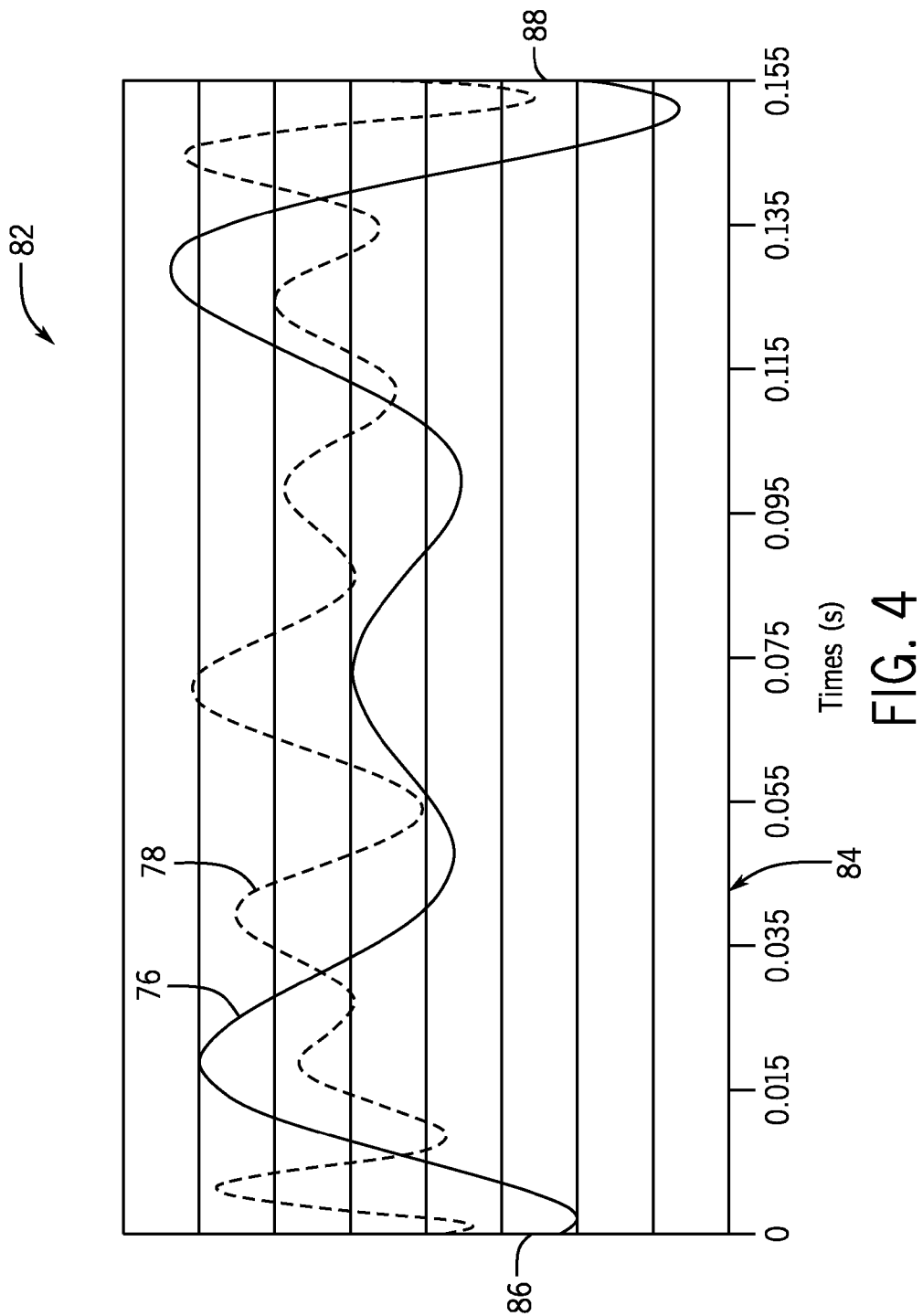
FIG. 4 is an embodiment of a combustion signature and a valve signature plotted over a first complete intake, compression, combustion and exhaust cycle in accordance with aspects of the present disclosure.

Multiple techniques are described herein, suitable for deriving the health of the second (e.g., mating) cylinder 80 by using the knock sensor 32 disposed on or in proximity to the first cylinder 26. The first techniques suitable for deriving the health of the mating cylinder 80 is to apply a signature analysis. As shown in FIG. 4, signals can be filtered into a combustion signature 76 and a valve signature 78. The signatures 76, 78 may correspond to or be correlative of signatures for the mating cylinder 80 derived via signals from the knock sensor 32. Events can then be derived from the signatures and the timing of those events checked between the measured cylinder 26 and its mating cylinder 80 (i.e., the cylinder in the engine that is 360 degrees out of phase with the measured cylinder 26). Once data from the one or more knock sensors 32 is collected, one or more filters may be applied to the data to derive a combustion signature 76 (i.e., noise attributable to combustion events) and a valve signature 78 (i.e., noise attributable to valve 58, 60 movement). As is discussed with regard to FIG. 11, the combustion signature 76 and valve signature 78 may be derived by applying filters, fast Fourier transforms (FFT), or applying other digital signal processing (DSP) techniques to the sampled data. For example, the ECU 34 may derive the combustion signature 76 by applying a low pass filter at 1200 Hz or a band pass filter from 0.5 Hz to 1200 Hz. The valve signature may be derived using a band pass filter from 12 kHz to 18 kHz. FIG. 4 is an embodiment of a sample plot 82 of a combustion signature 76 and a valve signature 78 over a first complete intake, compression, combustion and exhaust cycle. The x-axis 84 is shown as time in seconds, but may also be shown as crank angle (see FIG. 5). The y-axis 86 on the left corresponds to the valve signature 78, and the y-axis 88 on the right corresponds to the combustion signature 76. Each of the y-axes 86, 88 represents the amplitude of the corresponding noise signature 76, 78. Depending upon the measurement technique and the preference of the user, the units may be dB, volts, or some other unit). Note that the scales of the y-axes 86, 88 may be different because the amplitudes of the two signatures 76, 78 are likely to be different. FIG. 4 is illustrative of data that may be undergoing data processing, for example, via a process described in more detail with respect to FIGS. 5, 6, and 11. The data for FIG. 4 may include data transmitted via the knock sensor 32 and the crank angle sensor 62 once the ECU 34 has derived a combustion signature 76 and a valve signature 78 from the data using digital signal processing (DSP) techniques. Furthermore, for the sake of clarity, only a single combustion signature and a single valve signature are shown in FIG. 4. It should be understood, however, that the same or similar processing may be performed on more than one knock sensor 32 mounted to more than one cylinder.

The combustion signature 76 includes significant combustion events, such as peak firing pressure (PFP) of both the measured cylinder 26, and a mating cylinder 80 (i.e., the cylinder in the engine that is 360 degrees out of phase with the measured cylinder 26). The valve signature 78 includes the closing of the intake valve 58 and exhaust valve 60. Some combustion events, such as PFP (of both the measured cylinder 26 and the mating cylinder 80), may appear in both the combustion signature 76 and the valve signature 78. FIG. 4 shows slightly more than one complete combustion cycle, or 720 degrees of rotation (two complete revolutions) at the crankshaft 50. Each cycle includes intake, compression, combustion, and exhaust.

Figure 5:
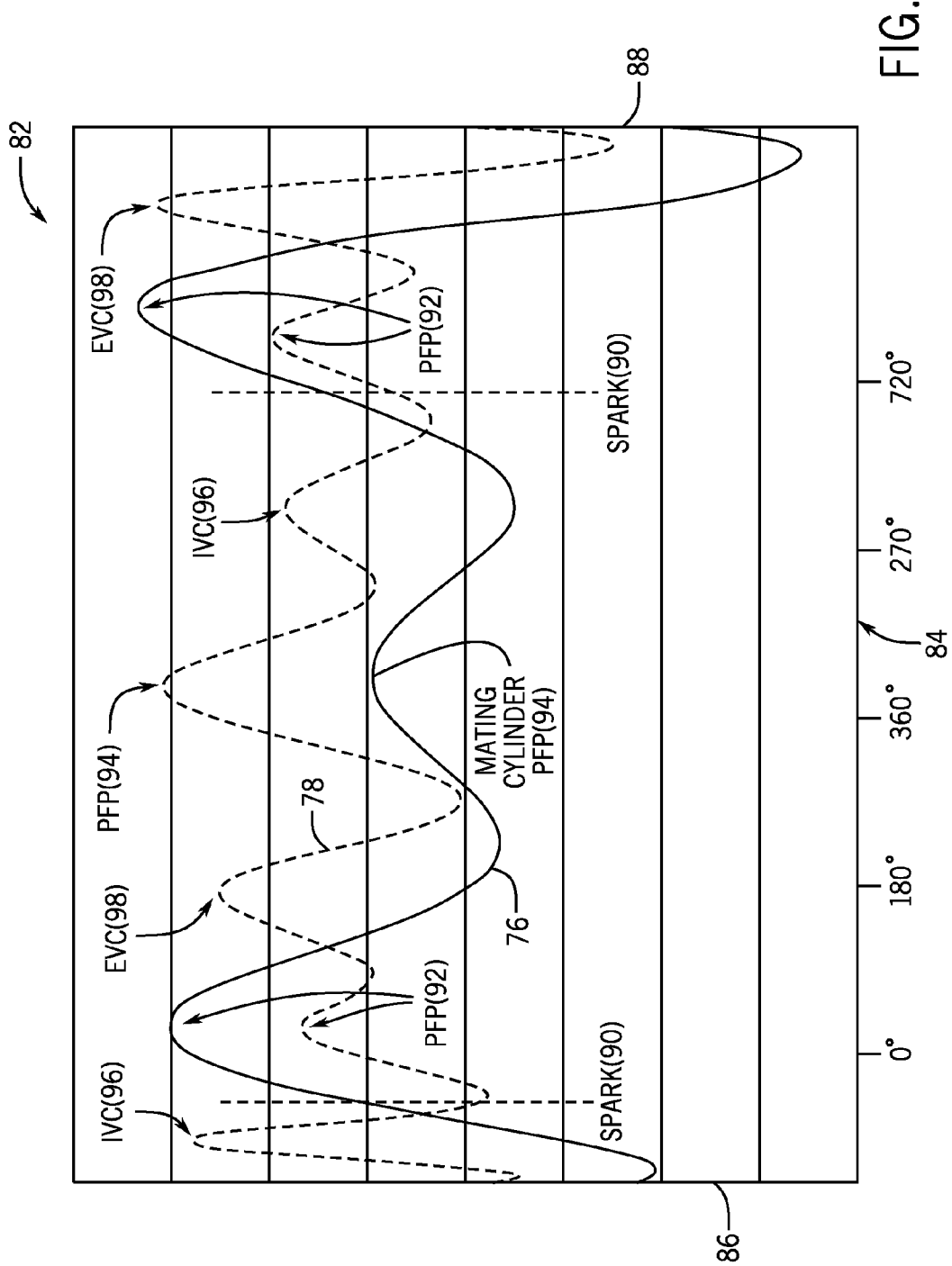
FIG. 5 is an embodiment of a combustion signature and a valve signature plotted over the first complete intake, compression, combustion, and exhaust cycle plotted by crank angle with derived events overlaid in accordance with aspects of the present disclosure.

FIG. 5 is an embodiment of a plot 82 of a combustion signature 76 and valve signature 78 over a complete intake, compression, combustion, and exhaust cycle with events overlaid. The x-axis 84 is shown as crank angle in degrees. This may be accomplished by aligning the timing of the data sampled from the crankshaft sensor 62 and the data sampled from the knock sensor 32. Though engine timing is commonly expressed in crank angle degrees, in some embodiments the x-axis may be expressed in time (e.g., seconds) as in FIGS. 3 and 4. As in FIG. 4, the y-axis 86 on the left side of plot 82 corresponds to the valve signature 78, and the y-axis 88 on the right side of the plot 82 corresponds to the combustion signature 76. The y-axes 86, 88 represent noise amplitude and, depending upon the measurement technique and the preference of the user, the units may be dB, volts, or some other unit. Also as in FIG. 4, the scales of the two y-axes 86, 88 are different because the amplitudes of the two signatures are different. The events may include timed spark 90, peak firing pressure (PFP) 92 of the monitored cylinder 26, PFP 100 of the mating cylinder 80, intake valve closure (IVC) 96, and exhaust valve closure (EVC) 98. The mating cylinder 80 is the cylinder in the engine that is 360 degrees out of phase with the measured cylinder 26 (i.e., the pistons of the mating cylinder 80 and the measured cylinder 26 are in the same positions, but the cylinders 26, 80 are in opposite phases of the combustion cycle).

The timing of the timed spark 90 is known because the ECU 34 controls the spark timing. Because the spark is known to happen in between the intake valve closure (IVC) 96 and combustion (PFP) 92, the ECU 34 can check the phasing of the signal from the knock sensor 32 by comparing the sequence of events in the knock sensor 32 signal to the known timing of the spark 90. This will also be discussed in regard to FIG. 11. The increases in amplitude of the combustion signature 76 are due to combustion events in the measured cylinder 26 and the mating cylinder 80. As would be expected, the amplitude is generally greater for combustion events of the measured cylinder 26 than combustion events of the mating cylinder 80. The peaks in amplitude of the combustion signature 76 represent peak firing pressure (PFP) 92 in the measured cylinder 26, and mating cylinder PFP 94. The increases in amplitude in the valve signature 78 represent the closing of the intake valve 58 (IVC, 96) and the closing of the exhaust valve 60 (EVC 98). The valve signature 78 may also show increases in amplitude due to PFP 92 in the measured cylinder 26 and PFP 94 of the mating cylinder 80. Because these events take place in a known order (e.g., IVC 96, PFP 92, EVC 98, mating cylinder PFP 94, IVC 96, etc.), at known crank angle positions, and produce different amplitudes (e.g., PFP 92 of the measured cylinder 26 will create a larger amplitude than mating cylinder PFP 94), the ECU 34 can determine which increases in amplitude correspond with certain events. This will be discussed further in regard to FIG. 11. It should be understood, however, that these events are merely examples and that the ECU 34 may derive some or all of these events, as well as events not shown in FIG. 5.

Figure 6:
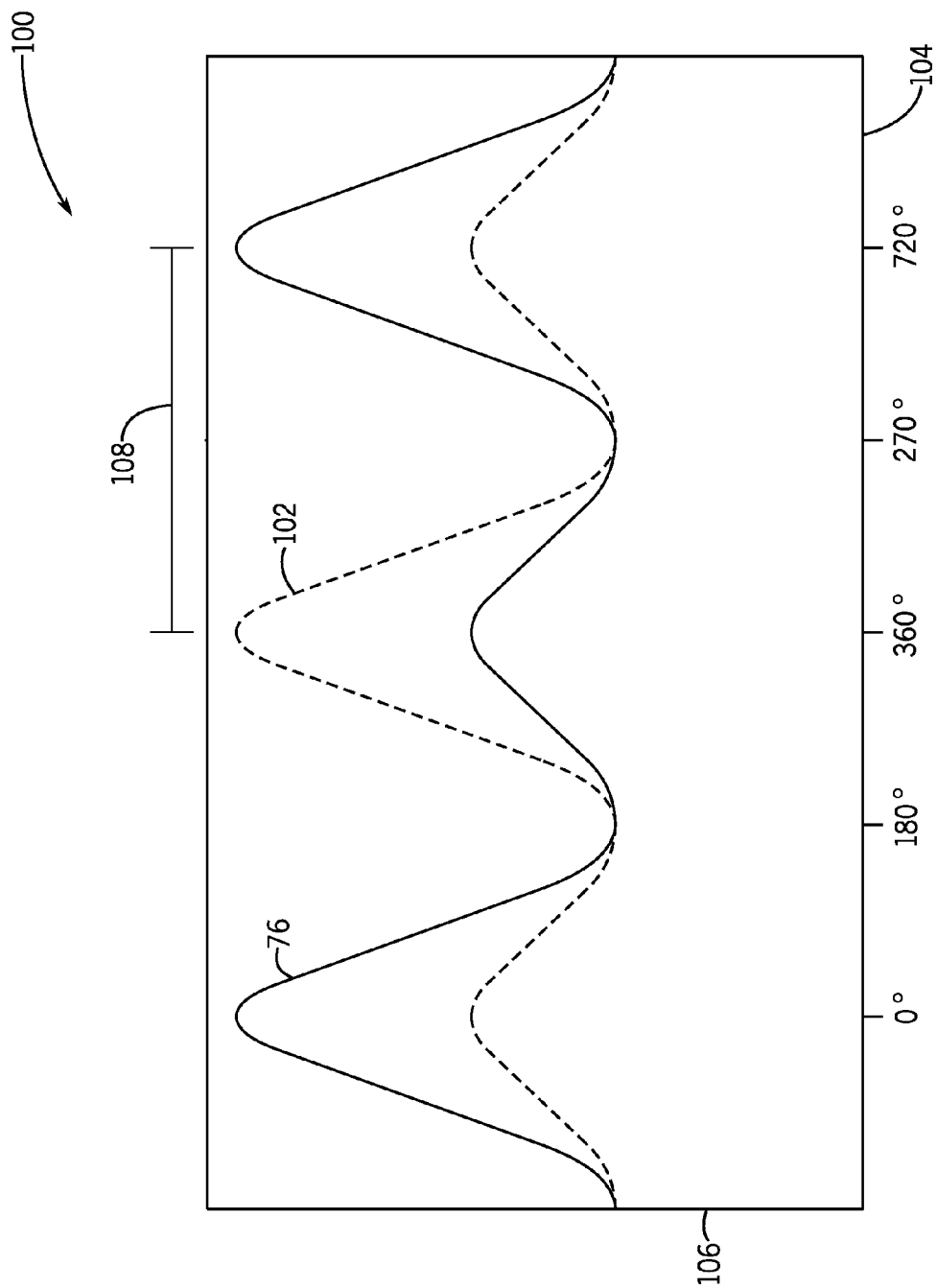
FIG. 6 is an embodiment of a combustion signature that is shifted 360 crank angle degrees in order to check for coherence with the mating cylinder in accordance with aspects of the present disclosure.

FIG. 6 is an embodiment of a plot 100 of the combustion signature 76 of the measured cylinder 26 and the combustion signature 102 of the mating cylinder 80. The x-axis 104 represents crankshaft angle in degrees. The y-axis 106 represents noise amplitude of the combustion signatures 76, 102. In order to check the knock sensor 32 measurement of one cylinder 26, the combustion signature 76 may be shifted by a time or crankshaft angle interval 108, (e.g., 360 crank angle degrees) and then the signatures 76, 102 checked against one another for coherence. Coherence may be determined by the phasing and sequence of combustion events, by comparing the ADSR vectors of the signals, by comparing amplitudes at various times, or some other method. Because the piston of the mating cylinder 80 is in the same position as the piston 24 of the measured cylinder, but in opposite parts of the combustion cycle, the measured cylinder should be approximately 360 crankshaft angle degrees out of phase with the mating cylinder. This correlation (i.e., that the mating cylinder 80 is 360 degrees out of phase with the measured cylinder 26) may apply to any cylinder in an engine. Once the signatures have been shifted such that they are substantially in phase with one another, the ECU 34 may check for coherence between cylinders 26, 80, using the timing of derived events, referencing a lookup table or a model, or some other method. Additionally, in the event of a malfunctioning knock sensor 32 on the mating cylinder 80, the ECU 34 may use the mating cylinder events that appear in the measured cylinder's signatures (e.g., mating cylinder PFP 94) to "limp home" and still have an idea of what is happening in the mating cylinder 80 without having to go into an emergency or safe run mode. Note that this idea may work in the opposite way. That is, if the knock sensor 32 on the measured cylinder 26 malfunctions, the knock sensor may use the signatures from the knock sensor 32 on the mating cylinder 80 to "limp home."

Figure 7:
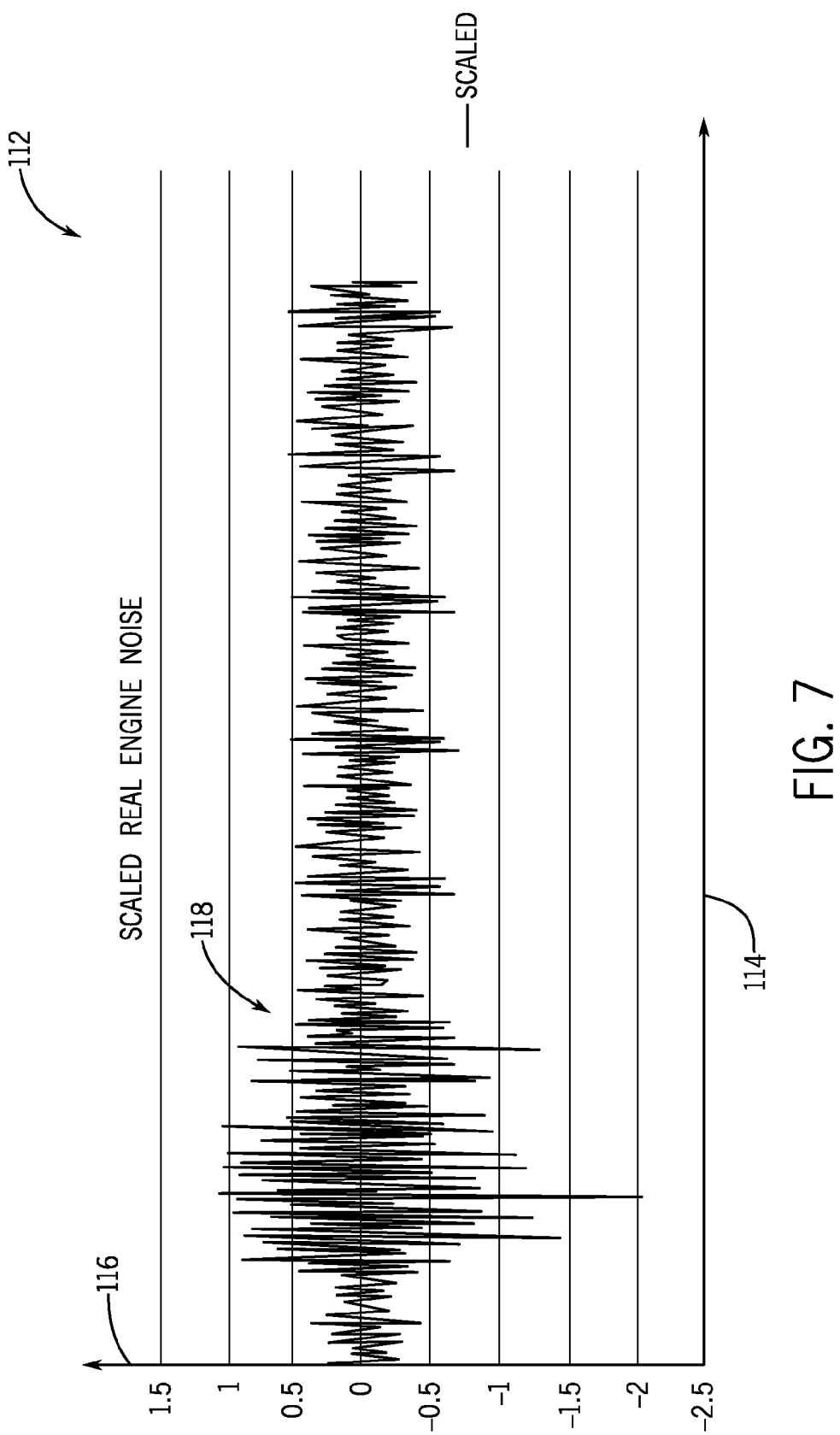
FIG. 7 is an embodiment of a scaled version of the sample engine noise plot shown in FIG. 3 in accordance with aspects of the present disclosure.

A second technique for deriving the health of the mating cylinder is using one or more ADSR envelopes, and then comparing vectors between the two signals. Before applying the ADSR envelope technique, the ECU 34 must scale the raw engine noise signal 74 from FIG. 3. FIG. 7 is an embodiment of a scaled engine noise plot 112, which may be derived by the ECU 34. The x-axis 114 may represent time or crankshaft angle. The y-axis 116 represents a scaled noise amplitude with a maximum amplitude of 1.0. In the scaled plot 112, the raw engine noise 74 from amplitude plot 68 shown in FIG. 3 has been scaled to derive the scaled amplitude curve 118. In this case, a single multiplier has been applied to each data point such that the maximum positive value of the scaled amplitude curve 118 is 1. Note that the multiplier applied to each point of curve 118 in order to produce a maximum positive value of 1 may result in negative values that are less than or greater than −1. That is, the maximum negative value may be −0.5, or it may be −1.9, as shown in scaled engine noise plot 112 shown in FIG. 7.

Figure 8:
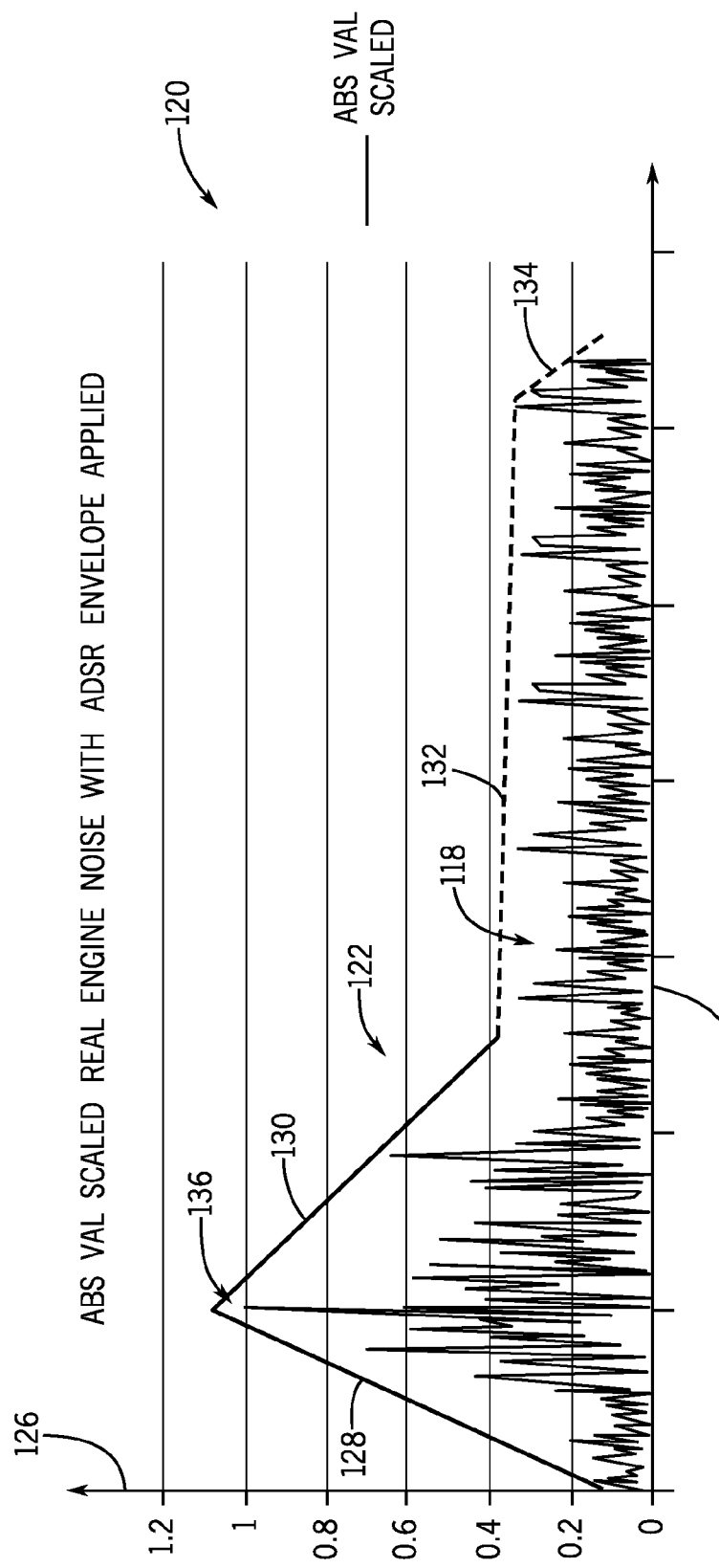
FIG. 8 is an embodiment of a sample scaled engine noise plot shown in FIG. 4 with four principle parameters of an attack, decay, sustain, release (ADSR) envelope overlaid in accordance with aspects of the present disclosure.

FIG. 8 is an embodiment of a scaled engine noise plot 120 showing four vectors of an attack, decay, sustain, release (ADSR) envelope 122. An x-axis 124 may represent time or crankshaft angle. A y-axis 126 represents a scaled noise amplitude with a maximum amplitude of 1.0. The ADSR envelope 122 is typically used in music synthesizers in order to mimic the sound of musical instruments. Advantageously, the techniques described herein apply the ADSR envelope 122 to knock sensor 32 data to more quickly and efficiently provide for certain noise analysis, as further described below. The four principle parameters (or vectors) of the ADSR envelope are attack 128, decay 130, sustain 132, and release 134. The attack 128 occurs from the start of the noise to a peak amplitude 136 of the scaled curve 118. The decay 130 occurs from the run down from the peak amplitude 136 to a designated sustain 132 level, which may be some specified percent of the maximum amplitude 136.

It should be understood that the order of the four vectors does not have to be attack 128, decay 130, sustain 132, and release 134. For example, for some noises, the order may be attack 128, sustain 132, decay 130, and release 134. In such cases, an ASDR, rather than ADSR, envelope would be applied. For the sake of clarity, this will be referred to as an "ADSR envelope," but it should be understood that the term applies to a noise regardless of the order of the parameters. The sustain 132 level is the main level during the noise's duration. In some embodiments, the sustain 132 level may occur at 55% of the maximum amplitude. In other embodiments, the sustain 132 level may be 35%, 40%, 45%, 50%, 60%, or 65% of the maximum amplitude. A user, or the ECU 34, may check whether the sustain level is as desired by determining whether the sustain 132 level is held for at least 15% of the duration of the signature. If the sustain 132 lasts more than 15% of the duration of the signature, the sustain 132 level is set as desired. The release 134 occurs during the run down from the sustain 132 level back to zero. Once the ADSR vectors have been derived from signals of the measured cylinder 26 and the mating cylinder 80, the vectors may be checked against one another for coherence.

Figure 9:
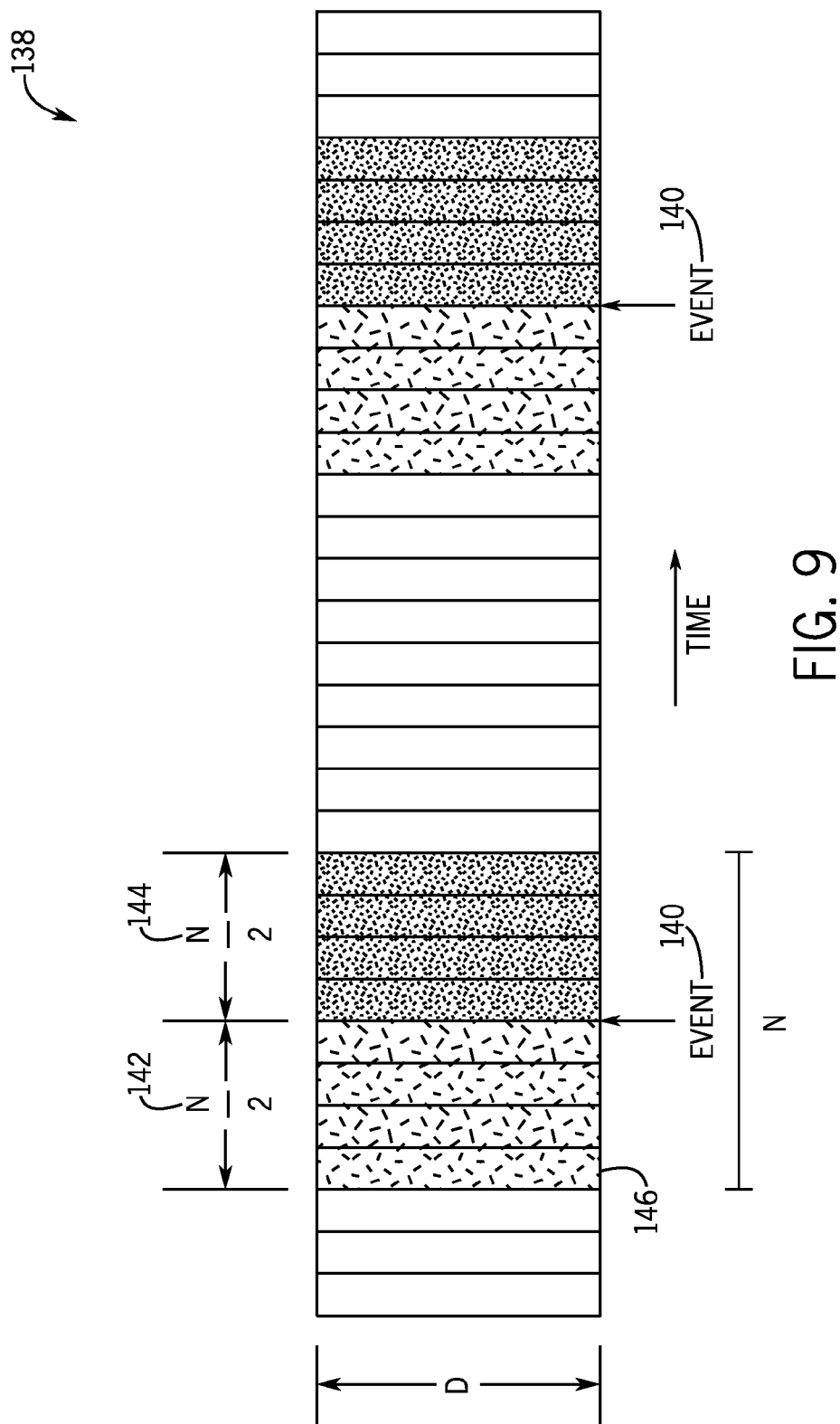
FIG. 9 is an embodiment of a two-state machine learning model using feature vectors in accordance with aspects of the present disclosure.

A third technique to monitor the health of the mating cylinder 80 is by using machine learning, which can be accomplished in two ways: using feature vectors and predictive frequency bands. Using feature vectors to monitor the health of the mating cylinder 80 may utilize a non-stationary, probabilistic model 138 of the acoustic signal to model a segment of the signal containing the engine event 140 to be detected (e.g., PFP 92, IVC 96, EVC 98, etc.), as shown in an embodiment of FIG. 9. Sudden onset engine events 140 are characterized in frequency by a broadband, dramatic increase in energy across the spectrum. The signal is first transformed into a sequence of D-length feature vectors 142, 144 using some multivariate, frequency-based transformation. A two state model 138 of N/2 feature vectors 142 before the event (state 1) and N/2 vectors 144 after the event (state 2), is shown in FIG. 9. A statistical model such as a Gaussian mixture model is trained for states 1 and 2. Once the model is trained, detecting the event 140 is done by centering an N-length window 146 on the nominal or expected time occurrence of the event 140. The length, N, should be such that the event 140 occurs in the N-length window 146 with high probability. The Gaussian mixture model may be governed by the following equations:

$$p(w \mid X) = \frac{p(X, w)}{p(X)} \propto p(X, w) \quad (1)$$

$$p(X, w; \lambda) = \Pi_{t=1}^{m} p(X_t; \theta_{w_t}) \quad (2)$$

$$\hat{w} = \mathrm{argmax}_w p(X, w) \quad (3)$$

$$\hat{w} = \mathrm{argmax}_w \Pi_{t=1}^{m} p(X_t; \theta_{w_t}) \quad (4)$$

wherein X is an N×D matrix of feature vectors, and w is a sequence of 1 s and 2 s. The event occurrence time is determined by finding the sequence $\hat{w}$ that maximizes the joint likelihood or posterior probability p(X, w) according to the statistical model of choice. Because a list of all allowable sequences must begin with all 1 s, and end with all 2 s, only N+1 possibilities exist for an N-length sequence. The estimated occurrence time of the event 140 is the time at which the state changes from 1 to 2.

Figure 10:
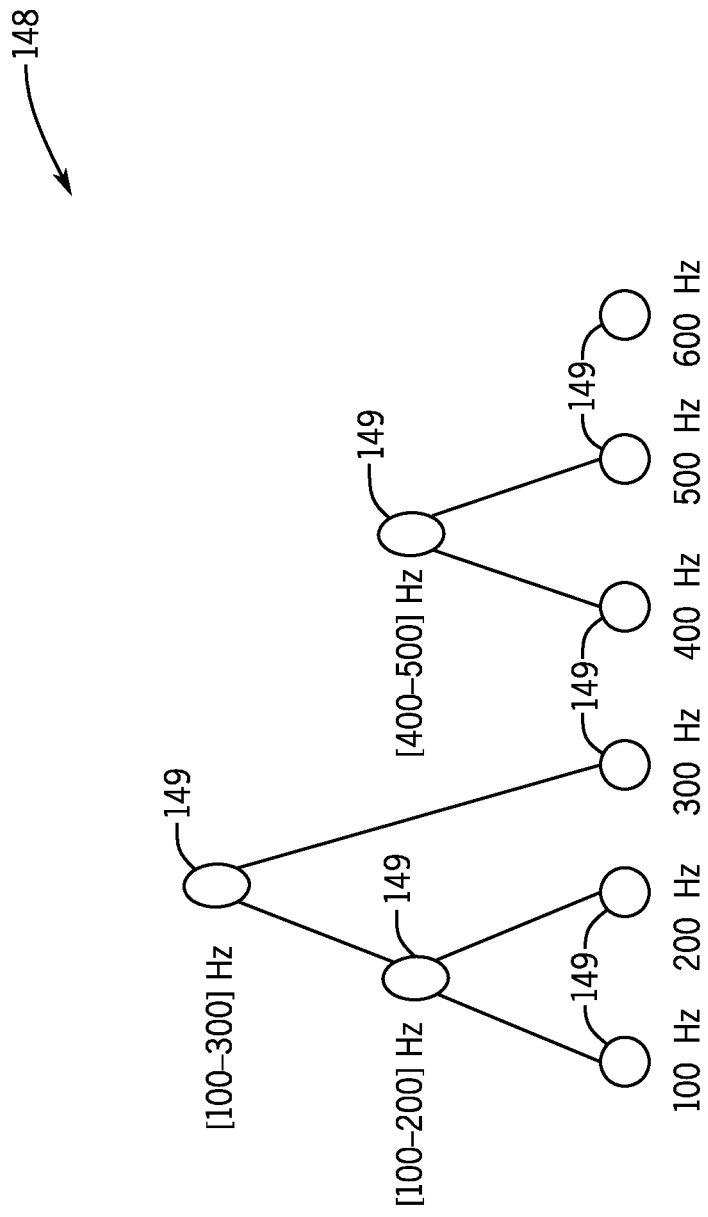
FIG. 10 is an embodiment of a model using predictive frequency bands and short time Fourier transform in accordance with aspects of the present disclosure.

The second way to monitor the health of the mating cylinder 80 using machine learning is to use predictive frequency band (PFB) model 148, as shown in an embodiment in FIG. 10. To train the model 148, the model 148 takes as input the knock sensor 32 signal as well as the actual PFP 92 locations (determined from direct measurements of the in-cylinder pressure using pressure sensors, for example, in a test bench or in the field). Because the true PFP locations are known in the training mode, the windows during which PFP 92 events (sub-signals) happen are labeled as positives and other sub-signals as negatives. The model applies signal processing and machine learning techniques to analyze the knock signal in order to learn the signature that indicates the occurrence of PFP 92. The model applies short-time Fourier transform to obtain the frequency content of the signal over time and then mines the predictive frequency bands that are most important for discriminating PFP events from the rest of the signal.

Starting from the power spectral density representation of the sub-signals in different windows (both positives and negatives), the model evaluates the discriminative power of every discrete frequency in the spectrum. Specifically, to evaluate frequency $F_a$, the energy at $F_a$ is computed for all sub-signals and the top k are selected, where k is the total number of positives. The discriminative score (D-score), is the proportion of true positives (true PFP 92) in the top k. All instances are projected onto a real line that represents the energy at a specific frequency $F_a$. After computing the D-score for each frequency, the method attempts to create larger frequency intervals in order to improve discrimination. These intervals are called Predictive Frequency Bands (PFBs), shown as nodes 149. For example, if $F_a$ and $F_{(a+1)}$ are two adjacent frequencies in the spectrum, their energy can be summed to obtain the energy in the band ($F_a$, $F_{(a+1)}$). The model 148 keeps the band 149 if its D-score is larger than the D-scores of both $F_a$ and $F_{(a+1)}$. At each step, the model chooses a pair of adjacent frequencies (or bands 149) that leads to the highest D-score. Starting from all discrete frequencies, larger and larger intervals are created in a bottom-up fashion, as shown in FIG. 10.

The model 148 continues until no adjacent frequencies (or bands 149) can be combined without decreasing the D-score. After identifying the PFBs 149, every sub-signal (part of the knock signal at a specific window location) is converted into a feature-vector representation, where the $n^{th}$ feature corresponds to the energy of the sub-signal in the $n^{th}$ PFB. For example, if band 100-300 Hz is identified to be a PFB, a feature that corresponds to the energy in this range is created for every sub-signal. The model then invokes a machine-learning algorithm for learning a model that can predict the probability of PFP 92 in new signals. It should be understood that the training process is performed before using the knock sensor 32 to derive the health of the mating cylinder 80 and that in most cases, a user will obtain an embodiment of the model 148 that has already been trained, for example, by the manufacturer of the engine system 10, and may not go through the training process. As such, the training process is described herein for the sake of clarity and in some cases may be omitted when using the systems and methods described herein.

In operation mode, the model 148 receives a new signal from the knock sensor 32. Using the PFBs 149 and predictive model learned in training mode, the model 148 applies a short-time Fourier transform to the knock signal, derives features of the sub-signals at each window location (based on the PFBs 149), and then applies the model to compute the probability of PFP 149 at each time. For each engine cycle, the time with the largest probability is the predicted PFP 92 location. Either of these two machine learning techniques (i.e., feature vectors shown in FIG. 9 and predictive frequency bands shown in FIG. 10) may be used to predict the timing of certain events in the mating cylinder 80 using a signal from a knock sensor 32 mounted on the measured cylinder 26 and thus derive the health of the mating cylinder.

Figure 11:
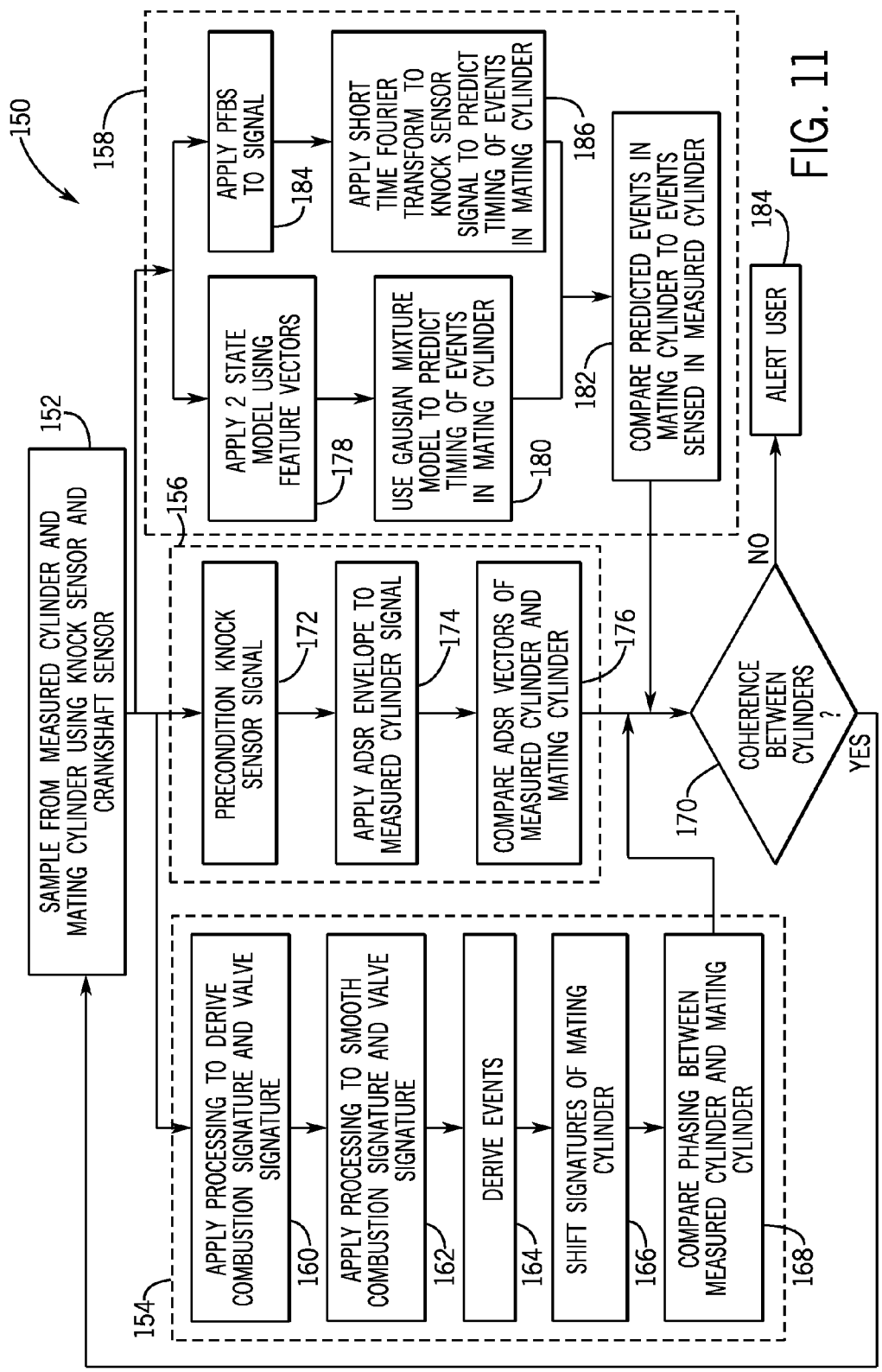
FIG. 11 is a flow chart showing multiple embodiments of a process for deriving the health of the mating cylinder using knock sensors in accordance with aspects of the present disclosure.

FIG. 11 is a flow chart showing embodiments of a process 150 for deriving the health of the mating cylinder 80 using signature analysis, ADSR analysis, and/or machine learning. The process 150 may be implemented as computer instructions or executable code stored in the memory 66 and executable by the processor 64 of the ECU 34. In block 152, a sample of data is taken using the knock sensors 32 and the crankshaft sensor 62. For example, the sensors 32, 62 collect signals or data and then transmit the signals or data to the ECU 34. The process 150 may then use signature analysis 154, ADSR analysis 156, and/or machine learning 158 to determine the health of the measured cylinder 26 and the mating cylinder 80. Alternatively, the same techniques may be used to determine the health of the mating cylinder based solely upon the knock sensor 32 signal of the measured cylinder 26, in the event that the knock sensor 32 attached to the mating cylinder 80 malfunctions.

If the process 150 uses signature analysis 154, in block 160, the process 150 processes the data to derive the combustion signature 76 and the valve signature 78, for the various cycles that were logged, as shown in FIG. 4. Block 160 may involve applying filters, fast Fourier transforms (FFT), or applying other digital signal processing (DSP) techniques to derive the combustion signature 76 and the valve signature 78. For example, the process 150 may derive the combustion signature 76 by applying a low pass filter at 1200 Hz or other natural frequencies that may be detected for the combustion event. The low pass filter may also be at 900 Hz, 1000 Hz, 1100 Hz, 1300 Hz, 1400 Hz, or 1500 Hz. Alternatively, the process 150 may derive the combustion signature by applying a band pass filter from 0.5 Hz to 1200 Hz. Similarly, the high and low ends of the band pass filter may vary. For example, the low end of the band pass filter may be 0.1 Hz, 0.3 Hz, 1 Hz, 3 Hz, 5 Hz, or 10 Hz. The high end of the band pass filter may be 900 Hz, 1000 Hz, 1100 Hz, 1300 Hz, 1400 Hz, or 1500 Hz. The valve signature may be derived using a band pass filter from 12 kHz to 18 kHz. Again, the high and low ends of the band pas filter may vary. For example, the low end of the band pass filter may be 9 kHz, 10 kHz, 11 kHz, 13 kHz, or 15 kHz. The high end of the band pass filter may be 16 kHz, 17 kHz, 19 kHz, 20 kHz, or 21 kHz. In general, the combustion signature 76 will be a lower frequency signal than the valve signature 78.

In block 162 to combustion signature 76 and valve signature 78 may be processed to smooth the signatures. Block 162 may involve a moving trend line or a poly-curve fit to smooth out the signatures 76, 78. If the signatures 76, 78 are sufficiently smooth after processing, smoothing may not be necessary.

In block 164, the process 150 derives sets of events using the known crankshaft 50 angles and timed sparks 90, as described with respect to FIG. 5. The events include timed spark 90, peak firing pressure (PFP) 92 of the monitored cylinder 26, PFP 94 of the mating cylinder 80, intake valve closure (IVC) 96, and exhaust valve closure (EVC) 98. The timing of the timed spark 90 is known because the ECU 34 controls the spark timing. The increases in amplitude of the combustion signature 76 are due to combustion events in the measured cylinder 26 and the mating cylinder 80. As would be expected, the amplitude is greater for combustion events of the measured cylinder 26 than combustion events of the mating cylinder 80. The peaks in amplitude of the combustion signature 76 represent peak firing pressure (PFP) 92 in the measured cylinder 26, and mating cylinder 80 PFP 94.

The peaks in amplitude in the valve signature 78 represent the closing of the intake valve 58 (IVC, 96) and the closing of the exhaust valve 60 (EVC 98). The valve signature 78 amplitude may also peak due to PFP 92 in the measured cylinder 26 and PFP 94 of the mating cylinder 80. Because these events take place in a known order (e.g., IVC 96, PFP 92, EVC 98, mating cylinder PFP 94, IVC 96, etc.), at known crank angle positions and relative to known timed sparks 90, and produce different amplitudes (e.g., PFP 92 of the measured cylinder 26 will create a larger amplitude than mating cylinder PFP 94), the process 150 can determine which increases in amplitude correspond with certain events.

In block 166, in order to check the knock sensor 32 measurement of the measured cylinder 26, the process 150 may shift the combustion signature 76, the valve signature 78, or both, by a time or crankshaft angle interval 108 and then check the signatures from the two cylinders 26, 80 against one another for coherence. An example of this shift was discussed previously with regard to FIG. 6. Because the piston of the mating cylinder 80 is in the same position as the piston 24 of the measured cylinder 26, but in opposite parts of the combustion cycle, the measured cylinder should be approximately 360 crankshaft angle degrees out of phase with the mating cylinder. This correlation (i.e., that the mating cylinder 80 is 360 degrees out of phase with the measured cylinder) may apply to any cylinder in an engine. The process 150 may then compare the phasing of events between the two cylinders 26, 80, reference a model, or a look up table to derive the health of the mating cylinder. In decision 170, if there is coherence between the measured cylinder 26 and the mating cylinder 80, the process 150 returns to block 152 and samples more data. If there is not coherence between the measured cylinder 26 and the mating cylinder 80, the process 150 alerts the user (block 184). The user may be alerted in a number of different ways, including proprietary error codes, via a display, sounds or audio notifications, on a display, via text, and the like.

If the user uses ADSR analysis 156, in block 172, the process 150 pre-conditions the knock sensor 32 data. Block 156 includes plotting the raw knock sensor 32 data against crankshaft 50 position. A sample raw engine noise plot 68 was shown in FIG. 3 as the amplitude plot 74. Block 172 includes scaling the raw engine noise data. To scale the data, the process 150 determines a multiplier that would result in a maximum amplitude of positive 1. It should be noted that the maximum negative value has no effect on multiplier selection. The process 150 then multiplies each data point (e.g., data point in amplitude curve 74) by the multiplier, to derive the scaled amplitude curve 118, as shown in FIG. 7. It should be understood that the scaled engine noise plot 112 in FIG. 7 showing the scaled amplitude curve 118 is merely an example and not intended to limit the scope of this disclosure to plots that look the same or similar to scaled engine noise plot 118.

In block 174, the process 150 applies the ASDR envelope 122 to the engine 12 noise signal. The processing in this block was discussed in describing FIG. 8. The ASDR envelope 122 is used to divide a noise data set into four different parameters or vectors (attack 128, decay 130, sustain 132, release 134). As previously discussed, it should be understood that the order of the four parameters does not have to be attack, decay, sustain, and release. For example, for some noises, the order may be attack, sustain, decay, and release. For the sake of simplicity, this will be referred to as an "ADSR envelope," but it should be understood that the term applies to a noise regardless of the order of the parameters. Traditionally, the ASDR envelope 122 is used in the process of reproducing a musical sound like that of a trumpet. However, in the techniques described herein, the ASDR envelope may be used to categorize and characterize noises so they can compared to one another. The four principle parameters of the ADSR envelope 122 are attack 128, decay 130, sustain 132, and release 134. The attack 128 occurs from the start of the noise to the peak amplitude 136. The decay 130 occurs from in the run down from the peak amplitude 136 to a designated sustain 132 level, which is some specified percent of the maximum amplitude 136. The sustain 132 level is the main level during the noise's duration. In some embodiments, the sustain 132 level may occur at 55% of the maximum amplitude. In other embodiments, the sustain 132 level may be 35%, 40%, 45%, 50%, 60%, or 65% of the maximum amplitude. The process 150, may check whether the sustain level is as desired by determining whether the sustain 132 level is held for at least 15% of the duration of the signature. If the sustain 132 lasts more than 15% of the duration of the signature, the sustain 132 level is set as desired. The release 134 occurs during the run down from the sustain 132 level back to zero. The process 150 measures the time from zero to maximum amplitude 136 (the maximum amplitude should have a value of 1). The process 150 then measures the run down time from the maximum amplitude 136 to the designated sustain level 132. The process 150 then measures the level and time that the noise sustains. Finally, the process 150 measures the time it takes for the noise to run down from the sustain level 132 to zero. The process 150 then logs the ADSR vectors or segments defining the ADSR envelope 122.

In block 174, the process 150 may also derive tonal information (e.g., musical tones) from the data. The process 150 extracts tonal information from the data, identifying the three to five strongest tones in the data. The ECU 25 may derive five or more tones from the data. The process 150 then logs the derived tonal information, which may include the frequency of the fundamental derived tones (i.e., the lowest frequency tones), the order of the fundamental derived tones, the frequency of the harmonic derived tones (i.e., tones with a frequency that is an integer multiple of the fundamental frequency), the order of the harmonic derived tones, and any other relevant tonal information. In block 174 the process 150 may also create a fingerprint based upon the ASDR envelope 122 and the tonal information derived. The fingerprint includes a characterization of the cylinder signal, breaking the signal up into its component parts (e.g., ADSR envelope 122 components 128, 130, 132, 134).

In block 176 the process 150 compares the fingerprints (i.e., the ADSR vectors, and sometimes extracted tonal information) between the measured cylinder 26 and the mating cylinder 80. In decision 170, if there is coherence between the measured cylinder 26 and the mating cylinder 80, the process 150 returns to block 152 and samples more data. If there is not coherence between the measured cylinder 26 and the mating cylinder 80, the process 150 alerts the user (block 184). The user may be alerted in a number of different ways, including proprietary error codes, via a display, sounds or audio notifications, on a display, via text, and the like.

If the process 150 uses machine learning 158, the process 150 may use feature vectors or predictive frequency bands (PFBs). To use feature vectors, in block 178, the process 150 applies a two-state model using feature vectors. The model may include two states of N/2 feature vectors, one before the event and one after. This was described in more detail with regard to FIG. 9. In block 180, the process 150 uses a Gaussian mixture model to predict timing of events in the mating cylinder. The process 150 does this by finding the sequence ŵ that maximizes the joint likelihood of an event. This was also described with regard to FIG. 9. In block 182, the process compares the predicted events in the mating cylinder to events sensed in the measured cylinder in order to derive the health of the mating cylinder.

Alternatively, the process 150 may utilize machine learning with predictive frequency bands (PFBs). In block 184, the process 150 applies the predictive frequency bands to the signal. This was previously described in detail with regard to FIG. 10.

In block 186, the process 150 applies a short-time Fourier transform to the knock signal, derives features of the subsignals at each window location (based on the PFBs), and then applies the model to compute the probability of PFP 92 (or some other event) at each time. For each engine cycle, the time with the largest probability is the predicted PFP 92 (or other event) location. In block 182, the process compares the predicted events in the mating cylinder to events sensed in the measured cylinder in order to derive the health of the mating cylinder. In decision 170, if there is coherence between the measured cylinder 26 and the mating cylinder 80, the process 150 returns to block 152 and samples more data. If there is not coherence between the measured cylinder 26 and the mating cylinder 80, the process 150 alerts the user (block 184). The user may be alerted in a number of different ways, including proprietary error codes, via a display, sounds or audio notifications, on a display, via text, and the like. The user may then decide what action to take (e.g., shut down the engine, run the engine is a safe mode, continue operations as planned, etc.) going forward.

Technical effects of the disclosure include systems and methods for deriving the health of a first cylinder in a reciprocating device. The systems and methods described herein may include receiving a first signal from a first knock sensor in proximity to the first cylinder, receiving a second signal from a second knock sensor in proximity to a second cylinder, processing the first signal and the second signal, and deriving the health of the first cylinder by determining whether the first signal is coherent with the second signal. Processing may include signature analysis, application of the ADSR (or ASDR) envelope, machine learning, and the like. Machine learning may include the use of feature vectors or predictive frequency bands. Processing may also include smoothing the signals. In some embodiments, the mated cylinders may be 360 crank angle degrees out of phase with one another. The same systems and methods disclosed may also be used to derive the health of one cylinder using the knock sensor signal from another cylinder.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of deriving the health of a first cylinder in a reciprocating device, comprising:
receiving a first signal from a first knock sensor in proximity to the first cylinder;
receiving a second signal from a second knock sensor in proximity to a second cylinder;
processing the first signal and the second signal; and
deriving the health of the first cylinder by determining whether the first signal is coherent with the second signal.

2. The method of claim 1, wherein the first cylinder is 360 crank angle degrees out of phase with the second cylinder.

3. The method of claim 1, wherein processing the first signal and the second signal comprises:
deriving first and second combustion signatures from the first and second signals by applying a band pass or low pass filter;
deriving first and second valve signatures from the first and second signals by applying a band pass filter;
deriving one or more events from the first and second combustion signatures and first and second valve signatures;
shifting the first combustion signature and the first valve signature or the second combustion signature and the second valve signature by 360 crank angle degrees; and
comparing the first combustion signature to the second combustion signature, or the first valve signature to the second valve signature.

4. The method of claim 3, wherein the one or more events comprise peak firing pressure, intake valve closure, exhaust valve closure, or a combination thereof.

5. The method of claim 3, wherein processing the first signal and the second signal comprises smoothing the first and second combustion signatures and the first and second valve signatures.

6. The method of claim 1, wherein processing the first signal and the second signal comprises:
scaling the first and second signals, wherein each data point included in the first and second signals is multiplied by a multiplier such that each of the first and second signals has a maximum amplitude of 1;
measuring a first period of time between a start of the scaled signal and a time at which the scaled signal reaches a maximum amplitude;
measuring a second period of time between the time at which the scaled signal reaches the maximum amplitude and a second time at which the scaled signal runs down to a sustain level;
measuring a third period of time during which the scaled signal sustains; and
measuring a fourth period of time during which the scaled signal runs down from the sustain level to zero.

7. The method of claim 1, wherein processing the first signal and the second signal comprises applying machine learning techniques to predict an occurrence of one or more events in the first and second signals.

8. The method of claim 7, wherein applying machine learning techniques comprises:
applying a two-state model using feature vectors; and
using a Gausian mixture model to predict an occurrence of one or more events in the first or second cylinder.

9. The method of claim 7, wherein applying machine learning techniques comprises:
applying predictive frequency bands to the first and second signal; and
applying short time Fourier transforms to the first and second signal to predict an occurrence of one or more events in the first or second cylinder.

10. The method of claim 1, further comprising:
  determining that the first knock sensor has malfunctioned; and
  wherein deriving the health of the first cylinder comprises:
    deriving a combustion signature from the second signal by applying a band pass or low pass filter;
    deriving a valve signature from the second signal by applying a band pass filter;
    deriving one or more events from the combustion signature and the valve signature; and
    using a lookup table to determine which of the one or more events should be occurring during operation of the reciprocating device at a known time or at a known crankshaft angle position.

11. A system, comprising:
  a controller configured to control a reciprocating engine, wherein the controller comprises a processor configured to:
    receive a first signal from a first knock sensor in proximity to a first cylinder;
    receive a second signal from a second knock sensor in proximity to a second cylinder;
    process the first signal and the second signal; and
    derive the health of the first cylinder by determining whether the first signal is coherent with the second signal.

12. The system of claim 11, wherein the first cylinder is 360 crank angle degrees out of phase with the second cylinder.

13. The system of claim 11, wherein processing the first signal and the second signal comprises:
  deriving first and second combustion signatures from the first and second signals by applying a band pass or low pass filter;
  deriving first and second valve signatures from the first and second signals by applying a band pass filter;
  smoothing the first and second combustion signatures and the first and second valve signatures;
  deriving one or more events from the first and second combustion signatures and first and second valve signatures;
  shifting the first combustion signature and the first valve signature or the second combustion signature and the second valve signature by 360 crank angle degrees; and
  comparing the first combustion signature to the second combustion signature, or the first valve signature to the second valve signature.

14. The system of claim 13, wherein the one or more events comprise peak firing pressure, intake valve closure, exhaust valve closure, or a combination thereof.

15. The system of claim 11, wherein processing the first signal and the second signal comprises:
  scaling the first and second signals, wherein each data point included in the first and second signals is multiplied by a multiplier such that each of the first and second signals has a maximum amplitude of 1;
  measuring a first period of time between a start of the scaled signal and a time at which the scaled signal reaches a maximum amplitude;
  measuring a second period of time between the time at which the scaled signal reaches the maximum amplitude and a second time at which the scaled signal runs down to a sustain level;
  measuring a third period of time during which the scaled signal sustains; and
  measuring a fourth period of time during which the preconditioned signal runs down from the sustain level to zero.

16. The system of claim 11, wherein processing the first signal and the second signal comprises applying feature vectors or predictive frequency bands to predict an occurrence of one or more events in the first and second signals.

17. A non-transitory computer readable medium comprising executable instructions that when executed cause a processor to:
  receive a first signal from a first knock sensor in proximity to a first cylinder;
  receive a second signal from a second knock sensor in proximity to a second cylinder, wherein the first cylinder is 360 crank angle degrees out of phase with the second cylinder;
  process the first signal and the second signal; and
  derive the health of the first cylinder comprising determining whether the first signal is coherent with the second signal.

18. The non-transitory computer readable medium of claim 17, wherein processing the first signal and the second signal comprises:
  deriving first and second combustion signatures from the first and second signals by applying a band pass or low pass filter;
  deriving first and second valve signatures from the first and second signals by applying a band pass filter;
  deriving one or more events from the first and second combustion signatures and first and second valve signatures; and
  shifting the first combustion signature and the first valve signature or the second combustion signature and the second valve signature by 360 crank angle degrees.

19. The non-transitory computer readable medium of claim 17, wherein processing the first signal and the second signal comprises:
  scaling the first and second signals, wherein each data point included in the first and second signals is multiplied by a multiplier such that each of the first and second signals has a maximum amplitude of 1;
  measuring a first period of time between a start of the scaled signal and a time at which the scaled signal reaches a maximum amplitude;
  measuring a second period of time between the time at which the scaled signal reaches the maximum amplitude and a second time at which the scaled signal runs down to a sustain level;
  measuring a third period of time during which the scaled signal sustains; and
  measuring a fourth period of time during which the preconditioned signal runs down from the sustain level to zero.

20. The non-transitory computer readable medium of claim 17, wherein processing the first signal and the second signal comprises applying feature vectors or predictive frequency bands to predict an occurrence of one or more events in the first and second signals.

* * * * *